UNITED STATES PATENT OFFICE.

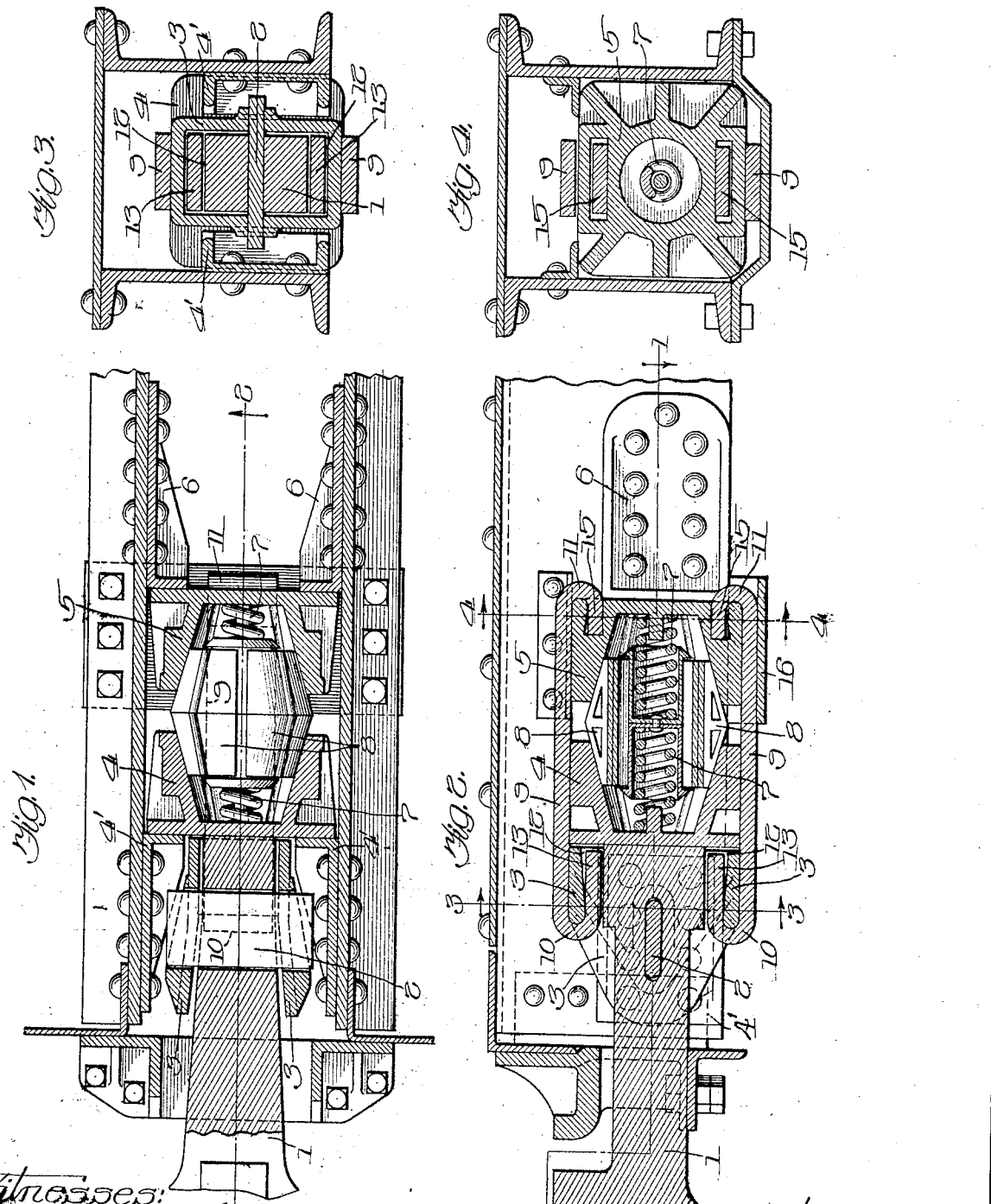

HERMAN C. PRIEBE, OF BLUE ISLAND, ILLINOIS.

DRAFT-GEAR.

1,108,231. Specification of Letters Patent. Patented Aug. 25, 1914.

Application filed September 12, 1913. Serial No. 789,432.

*To all whom it may concern:*

Be it known that I, HERMAN C. PRIEBE, citizen of the United States, residing at Blue Island, in the county of Cook and State of Illinois, have invented a certain new and useful Improvement in Draft-Gears, of which the following is a full, clear, concise, and exact description, reference being had to the accompanying drawings, forming a part of this specification.

My invention relates to draft gears and has for its object the provision of an improved form of union between coupler yokes and coupler stems or other parts subject to coupler thrusts and pulls, the preferred form of the device of my invention permitting, independently of the coupler yokes, of the application of thrusting strains from coupler stems to the parts that are to be affected by or that are to oppose such thrusting strains, without impairing the proper function of the yokes in transferring pulling strains from the coupler stems to the parts that are to be subject to such pulling strains. To accomplish this result, end portions of the yoke sides are turned to form hooks which enable the coupler stems to exert their pull, through the coupler yokes, upon the parts connected by the coupler yokes with the coupler stems, but which hooks are preferably either in sliding relation to said parts or to the coupler stems themselves when the latter are thrust inwardly. I am thus enabled, by the preferred construction to join the coupler yokes with complemental portions of the gear without the aid of bolts or rivets and to relieve the yoke sides of buckling pressures, though the invention is not to be limited to the absence of bolts or rivets.

The invention is of service in spring or friction draft gears but is not to be limited to these classes of coupling devices.

I will explain my invention fully by reference to the accompanying drawing showing one embodiment thereof in which—

Figure 1 is a sectional plan view on line 1 1 of Fig. 2; Fig. 2 is a sectional elevation on line 2 2 of Fig. 1; Fig. 3 is a cross sectional view on line 3 3 of Fig. 2; and Fig. 4 is a cross sectional view on line 4 4 of Fig. 2.

Like parts are indicated by similar characters of reference throughout the different figures.

The drawing illustrates friction draft gears but the invention is not to be limited to friction draft gears. The coupler there shown includes a stem or shank 1 (here shown as being a part of a standard coupler) in normally fixed relation with a key 2 that passes through the stem, and a stem collar 3 which surrounds the inner end of the stem and constitutes an enlargement of the inner end of the stem that operates upon a forward pocketed follower 4 when the coupler is moved inwardly. A rear or inner pocketed follower 5 is alined with the elements 1 and 4 and is adapted to be pressed against abutment cheek plates 6 by spring mechanism 7. The followers 4 and 5 are shown as being provided with conical seats which flare toward each other and within which conical seats wedging friction blocks 8 are disposed, these wedging blocks operating upon a coiled sheet metal spring in accordance with the invention set forth in my Patent 1,063,213, dated June 3, 1913, though my invention is not to be restricted to this class of apparatus.

When the coupler is pushed inwardly with sufficient force to contract the spring 7 the follower 4 will approach follower 5, such approach being retarded by the attendant friction. When the coupler is pulled upon with sufficient force to contract the spring 7 the follower 5 will approach the follower 4, such approach being retarded by the attendant friction. Draft pulls exerted by the coupler stem 1 upon the follower 5 are transmitted through spaced apart yoke side members 9 between which members the inner end of the coupler stem is disposed. These yoke members are turned at their ends to form hooks which preferably set in and which preferably are returned within the space between the yoke members 9 to face the members 9 to constitute with such yoke members or sides inturned U-shaped hooks 10, 11. Opposite sides of the stem collar 3 are provided with pockets 12 that receive the inner sides 13 of the hooks 10, these pockets being walled at the top, bottom and upon both sides of the hook portions 13 whereby the side yoke members 9 are prevented from approaching each other materially and are held substantially in the horizontal plane of the coupler stem 1. The rear follower 5 is provided with pockets that are walled upon the top, bottom and sides of the inner hook members 15 of the hooks 11 which they closely receive, whereby the rear portions of the yoke members 9 are held spaced apart and are confined substantially in the horizontal plane of the coupler stem, the lower coupler member 9 riding upon the support 16 secured to the center sills 17.

When the gear is subject to pulling strains there is no material relative longitudinal movement between any of the elements 3, 5, and 9. When there is sufficient pushing strain to cause the follower 4 to leave its abutments 4¹ and approach the follower 5, the short hook sides 13 and 15 may move longitudinally of the gear with respect to the pockets receiving them, owing to the consequent reduction of the space between the coupler stem and the rear follower 5, but the hook sides 13, 15 are so long that they cannot leave their pockets, the extent to which the follower 4 may approach the follower 5 being limited.

The short sides 13, 15, of the hooks are held parallel with the yoke sides companion thereto so that draft pulls cannot straighten the hooks. The outer walls of the pockets are flared readily to permit assembly of the parts.

Claims drawn to cover the novel connection of the coupler stem and yoke side members are included in the division of this application Serial No. 800,442, filed November 12, 1913.

While I have herein shown and particularly described some forms of my invention, it is obvious that changes may readily be made without departing from the spirit of the invention.

Having thus described my invention I claim as new and desire to secure by Letters Patent the following:

1. A draft gear including a coupler; a yoke having spaced apart side members engaged at their forward ends with the coupler stem, the inner ends of said side members being turned to form hooks; and an inner follower connected with said yoke by said hooks and with respect to which inner follower the yoke side members and short hook sides are movable longitudinally of the gear upon relative movement between the coupler and inner follower, said short hook sides extending lengthwise of and facing their companion hook sides, there being means for preventing the hooks from straightening.

2. A draft gear including a coupler; a yoke having spaced apart side members engaged at their forward ends with the coupler stem, the inner ends of said side members being turned to form hooks; and an inner follower having pocketed portions in the pockets of which the short sides of said hooks are received and with respect to which pockets said yoke side members and short hook sides are movable longitudinally of the gear, said short hook sides extending lengthwise of and facing their companion hook sides, the pockets that receive the short hook sides closely engaging the same to prevent the same to prevent the hooks from straightening.

3. A draft gear including a coupler; a yoke having spaced apart side members engaged at their forward ends with the coupler stem, the inner ends of said side members being turned to form hooks; and an inner follower having pocketed portions in the pockets of which the short sides of said hooks are received, said short hook sides extending lengthwise of and facing their companion hook sides, the pockets that receive the short hook sides closely engaging the same to prevent the hooks from straightening.

4. A draft gear including a coupler; a yoke having spaced apart side members engaged at their forward ends with the coupler stem, the inner ends of said side members being turned to form hooks; and an inner follower connected with said yoke by said hooks, said short hook sides extending lengthwise of and facing their companion hook sides, there being means for preventing the hooks from straightening.

In witness whereof, I hereunto subscribe my name this 9th day of September A. D., 1913

HERMAN C. PRIEBE.

Witnesses:
G. L. CROGG.
ETTA L. WHITE.